United States Patent
Saoji et al.

(10) Patent No.: US 9,665,857 B2
(45) Date of Patent: May 30, 2017

(54) CASH POSITION FORECASTING WITH REAL-TIME ANALYTICS

(71) Applicant: Oracle International Corporation, Redwood Shores, CA (US)

(72) Inventors: Deepa Pai Saoji, Fremont, CA (US); Keshava Mangipudi, Pleasanton, CA (US); Amira A. Morcos, San Roman, CA (US); Bhupinder Singh Sondhi, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/157,512

(22) Filed: Jan. 16, 2014

(65) Prior Publication Data
US 2015/0199661 A1    Jul. 16, 2015

(51) Int. Cl.
| | |
|---|---|
| G06Q 40/00 | (2012.01) |
| G06Q 20/10 | (2012.01) |
| G06Q 20/02 | (2012.01) |
| G06Q 10/04 | (2012.01) |
| G06Q 20/38 | (2012.01) |
| G06Q 20/40 | (2012.01) |
| G06Q 40/02 | (2012.01) |

(52) U.S. Cl.
CPC .......... *G06Q 20/10* (2013.01); *G06Q 10/04* (2013.01); *G06Q 20/023* (2013.01); *G06Q 20/381* (2013.01); *G06Q 20/405* (2013.01); *G06Q 40/02* (2013.01)

(58) Field of Classification Search
CPC ...................................................... G06Q 40/00
USPC ............................................................. 705/35
See application file for complete search history.

(56) References Cited

U.S. PATENT DOCUMENTS

| | | | |
|---|---|---|---|
| 8,296,200 B2 | 10/2012 | Mangipudi et al. | |
| 2003/0178281 A1* | 9/2003 | Goto ....................... | G07F 19/20 194/206 |
| 2004/0236647 A1* | 11/2004 | Acharya ............ | G06Q 20/0425 705/30 |
| 2011/0191213 A1 | 8/2011 | Mora et al. | |
| 2012/0072415 A1 | 3/2012 | Mora et al. | |
| 2012/0072817 A1 | 3/2012 | Dubey et al. | |

(Continued)

*Primary Examiner* — Edward Chang
(74) *Attorney, Agent, or Firm* — Kilpatrick Townsend & Stockton LLP

(57) ABSTRACT

A method, system, and computer program product for enterprise analytics. The method commences by requesting and receiving bank statement information from a bank computer where the bank statement information comprises at least a then current balance, then accessing a transaction repository to retrieve a transaction pipeline comprising deposit transactions and/or withdrawal transactions to be applied at future times to the then current balance. The method continues by forecasting a balance by applying at least a portion of the transaction pipeline to the then current balance. The resulting forecasted balance and reports are displayed for review by a user. The displays can include desktop or mobile displays or both. Transactions that involve multiple currencies can be converted into a selected currency of choice, and the balances and transactions are displayed in the denomination of the selected currency.

21 Claims, 7 Drawing Sheets

(56) References Cited

U.S. PATENT DOCUMENTS

2012/0254329 A1\* 10/2012 Majeti .................... G06F 21/10
  709/206
2014/0085307 A1   3/2014 Lei et al.
2014/0095233 A1   4/2014 Yeung et al.
2014/0095390 A1   4/2014 Lei et al.

\* cited by examiner

CASH POSITION FORECASTING WITH REAL-TIME ANALYTICS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of enterprise analytics and more particularly to techniques for cash position forecasting using real-time analytics.

BACKGROUND

As the inexorable trend toward globalization continues, the role of the cash manager of an enterprise grows more and more complex day by day. New subsidiaries or other entities are formed, new entities are acquired or divested, new foreign assets become accessible, currency rates change, new regulations become effective, and so on.

The legacy model, where a cash manager checks the balances of bank accounts and makes daily investment and/or position-covering decisions, is coming to the end of its usefulness. Now, a cash manager needs to know not only the cash balances at his or her bank or banks, but also needs to know what transactions are expected to hit which bank or banks, and when. For example, while a morning check of a bank account indicates a positive balance of $1,000,000, it might be the case that that particular day is a payday, and processing payroll via ACH from that account would deplete the account by $850,000, leaving only $150,000 to cover other transactions of that day. That might be enough, or it might not be enough—and the bank is utterly unable to provide an accurate forecast of intra-day changes, and the bank is utterly unable to provide an accurate forecast of balances as of the close of the business day, much less forecast further into the future.

Enterprises often have visibility into transactions of a given day (and/or in the future) as a natural benefit of having enterprise software applications. Although the banks are able to provide an up-to-date balance of a particular account, the cash manager needs much more visibility into upcoming transactions (e.g., including any scheduled deposits or withdrawals). Moreover, an enterprise may be comprised of many entities (e.g., a domestic subsidiary, a foreign subsidiary, etc.) and may have many banks and many bank accounts for various purposes—and each account subject to moment-by-moment transactions.

What is needed is a technique or techniques that amalgamate information retrieved from many external sources (e.g., banks, currency exchanges, etc.) and from many internal sources (e.g., accounts payable, accounts receivable etc.) to calculate a current cash position, forecast a daily cash position, and present cash positions to the cash manager in an easy to access form (e.g., in a summary chart accessible from a mobile terminal). Moreover, what is needed is a technique or techniques that provide such forecasted cash positions whenever changes are detected in the conditions that influence the forecast.

None of the aforementioned legacy approaches achieve the capabilities of the herein-disclosed techniques for cash position forecasting using real-time analytics. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for cash position forecasting using real-time analytics.

The method commences by requesting and receiving bank statement information from a bank computer where the bank statement information comprises at least a then current balance, then accessing a transaction repository to retrieve a transaction pipeline comprising deposit transactions and/or withdrawal transactions to be applied at future times to the then current balance. The method continues by forecasting a balance by applying at least a portion of the transaction pipeline to the then current balance. The resulting forecasted balance and reports are displayed for review by a user. The displays can include desktop or mobile displays or both. Transactions that involve multiple currencies can be converted into a selected currency of choice, and the balances and transactions are displayed in the denomination of the selected currency.

After an initial display, a new or updated transaction can be received, and the new transaction can be applied to a current balance to create an updated forecasted balance.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

DETAILED DESCRIPTION

Figure 1:
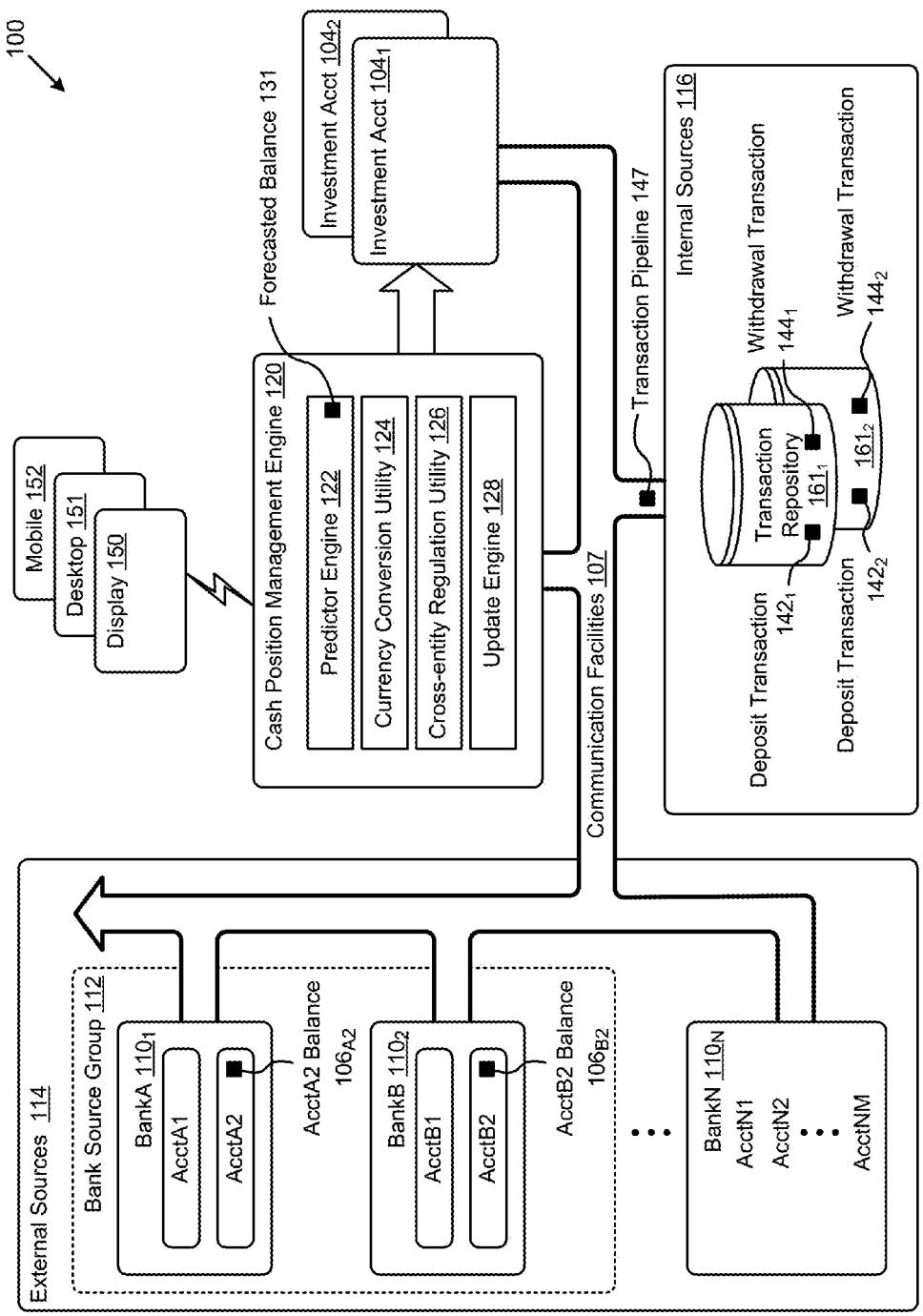
FIG. 1 is a block diagram of a system to implement cash position forecasting using real-time analytics, according to some embodiments.

Some embodiments of the present disclosure address the problem of calculating a cash position using multiple external and internal sources, and some embodiments are directed to approaches for forecasting cash positions using multiple external and internal sources. More particularly, disclosed herein and in the accompanying figures are exemplary environments, methods, and systems for cash position calculating and forecasting using real-time analytics.

Overview

Information pertaining to an enterprise's bank accounts and cash balances help a cash manager make sound investment and cash management decisions. As aforementioned the environment in which a cash manager operates has become globalized, and in the process, decisions have become extremely complex. Accordingly, cash managers and their colleagues (e.g., in a Finance Department) need to get into work earlier than others so as to retrieve bank account balances and/or other financial institution balances and study charts and numbers in order to be ready to approve and execute transactions (e.g., trades, payments, transfers, etc.) as soon as business of the day commences.

Enterprises often have visibility into transactions of a given day (and/or in the future) as a natural benefit of having access to enterprise software applications. Although the banks are able to provide a then-current balance of a particular account, the cash manager needs much more visibility into upcoming transactions (e.g., including any scheduled deposits or withdrawals). Moreover, an enterprise may be comprised of many entities (e.g., a domestic subsidiary, a foreign subsidiary, etc.) and the entities may use many banks and/or other financial institutions and many accounts for various purposes. Each such account is subject to moment-by-moment transactions.

What is needed is a technique or techniques that amalgamate information retrieved from many external sources (e.g., banks, currency exchanges, etc.), and from many internal sources such as enterprise software applications (e.g., accounts payable, accounts receivable etc.) to calculate a current cash position, forecast a daily cash position, and present cash positions to the cash manager in an easy to access form (e.g., in a summary chart accessible from a mobile terminal).

Moreover, what is needed is a technique or techniques that provide such forecasted cash positions whenever changes are detected in the conditions that influence the forecast.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Description of Exemplary Embodiments

FIG. 1 is a block diagram of a system 100 to implement cash position forecasting using real-time analytics. As an option, one or more instances of system 100 or any aspect thereof may be implemented in the context of the architecture and functionality of the embodiments described herein. Also, the system 100 or any aspect thereof may be implemented in any desired environment.

As shown, a cash position management engine 120 interfaces with multiple instances of external sources 114 over one or more communication facilities (e.g., path 107). The communication facilities can be secure (or unsecure) channels, possibly over a LAN and/or WAN. The external sources comprise banks (e.g., BankA $110_1$, BankB $110_2$, . . . BankN $110_N$, etc.) which may be grouped into source groups (e.g., bank source group 112).

Also shown is the cash position management engine 120 having one or more interfaces with any number of internal sources 116 over one or more communication facilities (e.g., path 107). The communication facilities can comprise secure channels or unsecure channels and can use either public or private networks, or both. The internal sources 116 may comprise data storage, a database engine, a file system, or any other subsystem (e.g., comprising hardware and/or software) that can store transactions (e.g., a deposit transaction $142_1$, a deposit transaction $142_2$, a withdrawal transaction $144_1$, a withdrawal transaction $144_2$, etc.) in any form of data storage (e.g., transaction repository $161_1$, transaction repository $161_2$, etc.). The cash position management engine 120 can access such internal sources 116 to retrieve transactions. A retrieval can include a set of transactions organized into a transaction pipeline 147. For example, the cash position management engine 120 can access internal sources 116 with a query to retrieve transactions intended to post to (for example) BankA within the day, or within a specified time period, and the set of transactions can be transmitted over communication facilities 107 in the form of a transaction pipeline 147 (e.g., comprising a single message, or comprising a series of messages).

The cash position management engine 120 may access many banks or other bank-like entities, and the many banks may provide descriptions of balances (e.g., AcctA2 balance $106_{A2}$, AcctB2 balance $106_{B2}$, etc.). For example, transactions can be described as being denominated in a particular currency. Moreover, in some cases the banks or other bank-like entities may be subjected to specific regulations (e.g., SEC regulations, IRS regulations, etc.) that restrict or limit otherwise prohibit them from processing certain transactions between certain entities. Accordingly the cash position management engine 120 may comprise a currency conversion utility 124 and a cross-entity regulation utility 126. Using the currency conversion utility 124 and a cross-entity regulation utility 126, transactions can be allowed/disallowed/limited/restricted and can be converted to a base currency of choice.

Now, having currency-normalized banking information (e.g., bank balances) from the external sources and having transactions (e.g., scheduled transactions) from the internal sources (e.g., an accounts payable application, an accounts receivable application, etc.) the cash position management engine 120 can implement a calculator engine to calculate a current cash position. Further the cash position management engine 120 can employ a predictor engine 122 to calculate a forecasted cash position (e.g., forecasted balance 131) for the end of the business day. Having an accurate current cash position and an accurate end-of-day cash position, the cash manager can make investment decisions, such as make an investment based on available cash, or such as redeeming cash-equivalent investments from an investment account (e.g., investment account $104_1$, investment account $104_2$, etc.) so as to cover any deficits forecasted to occur in any of the bank accounts.

During the time period between having a first accurate current cash position and the end of the day, new, unforeseen (or otherwise un-forecasted) transactions might take place (e.g., responsive to day-to-day operation of enterprise applications on an application server). If the magnitude of the unforeseen transactions exceeds a certain threshold, then it might be expeditious for the cash manager to be advised of the transactions and of their effect on the forecasted daily balance. Accordingly, the cash position management engine 120 can employ an update engine 128 to recognize asynchronous events, and/or send alerts (and/or other information) to the cash manager. The cash manager might receive such an update at a display 150 (e.g., desktop display 151, or a mobile terminal display 152, or both).

The information presented on the display can comprise text alerts (e.g., using SMS or texting), or can be in the form of any number of screen devices to comprise a graphical user interface. One such graphical user interface includes a dashboard, which is presently discussed.

Figure 2:
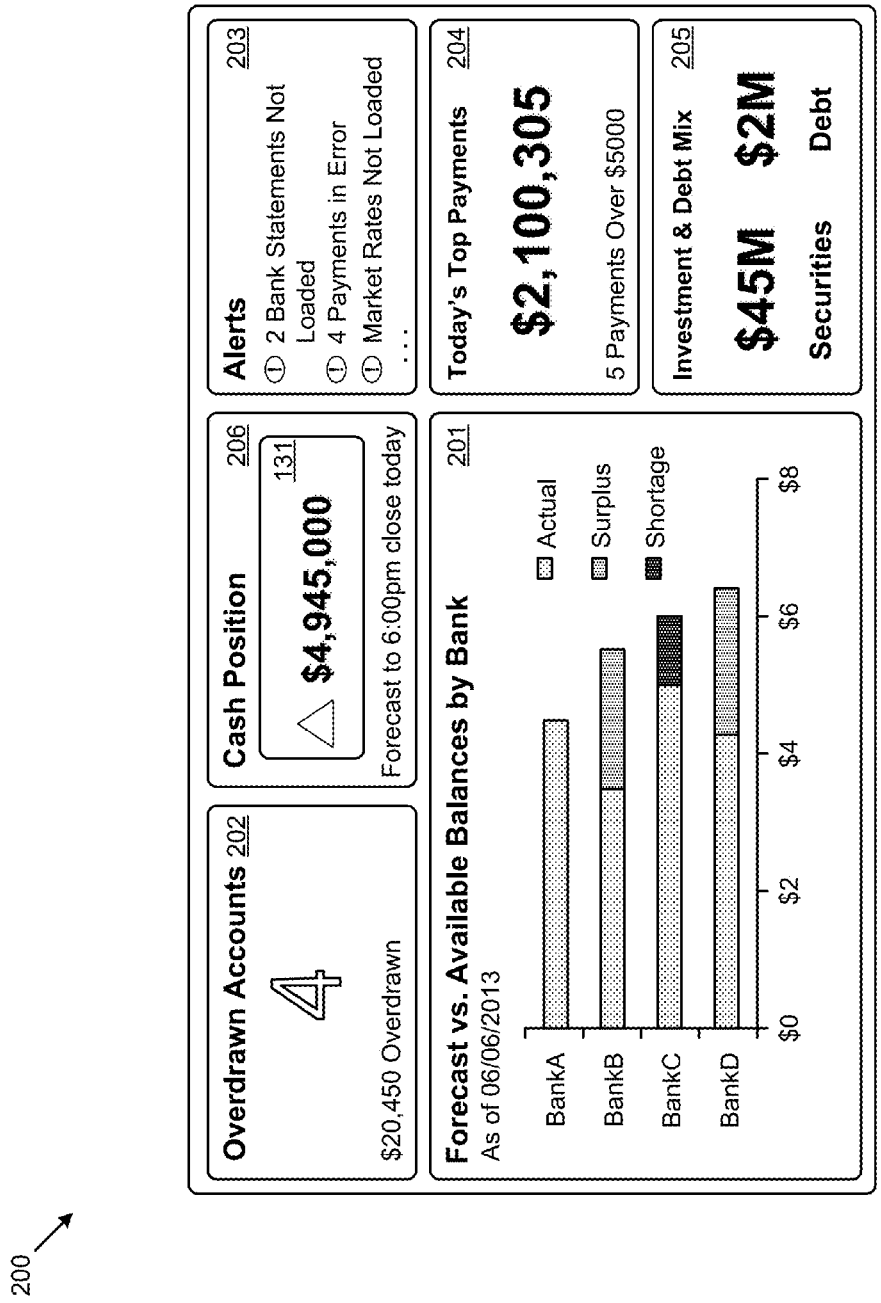
FIG. 2 is an image of a dashboard used as a graphical user interface to a system for cash position forecasting using real-time analytics, according to some embodiments.

FIG. 2 is an image of a dashboard 200 used as a graphical user interface to a system for cash position forecasting using real-time analytics. As an option, one or more instances of dashboard 200 or any aspect thereof may be implemented in the context of the architecture and functionality of the embodiments described herein. Also, the dashboard 200 or any aspect thereof may be implemented in any desired environment.

As shown, the dashboard is presented to the user in an array of panes. Any pane can be displayed as an abstract view (e.g., an icon), or as a summary view (as shown), or as a detailed view (see FIG. 3 and FIG. 4). The specific implementation of dashboard 200 comprises:

A pane showing cash forecasts by bank 201,
A pane showing a summary of overdrawn accounts 202,
An alerts pane 203,
A pane showing summaries of largest payments and receipts (top payments 204),
A portfolio view pane 205, and
A pane showing a forecasted net cash position 206.

The amounts displayed are converted (e.g., using currency conversion utility 124) into a particular currency selected by a user.

Any of the panes can include a link or links to subordinate displays. For example, selecting (e.g., clicking, hovering over, touching, etc.) an element in a pane forming the summary of largest payments and receipts (top payments 204) displays a table showing top payments and receipts that are scheduled to occur in the forecasted period. In some cases the top payments and receipts are sorted (e.g., for display) by the amount of the payment. A threshold can be applied to filter out smaller amounts.

The pane comprising cash forecast by bank 201 displays a bank balance for any one or more banks In some cases there may be many banks within the external sources 114. In such a case, the cash forecasted vs. available balances by bank 201 might summarize bank balances by a bank source group 112, or it might sort the individual ones of the one or more banks so as to select only the top several (e.g., based on the sorting order) from among the many banks within the external sources. In one embodiment, selecting an element within the pane holding the cash forecasted vs. available balances by bank 201 displays a chart (e.g., a pie chart) showing the relative amounts of cash at each of the many banks In situations where there are many banks with small amounts, the chart can display a selected set and number (e.g., 15-20) of the banks and then amalgamate the remaining balances in an "Others" category for display in the chart.

A drilldown indication (e.g., a hover or touch or click, etc.) causes displays of various details of the constituent bank or banks For example, the details might include all accounts for that bank, respective account numbers, respective account currencies, and the respective balances in the account given in the currency of the denominated account as well as the respective balance in the account given in a base currency.

The dashboard 200 can include an alerts pane 203, which alerts pane 203 may further comprise a notifications feed. This area can be configured to display alert and notification messages. For example, an alerts pane can be configured to segregate or distinguish various different type of messages:

Notification (e.g., a message indicating success of an operation such as "Process X completed successfully");
Warning (e.g., a message suggesting an optional configuration change or consideration such as "Process X completed without any changes in the forecast");
Alert (e.g., a message indicating occurrence of or cause of an error, such as "Process X failed with errors").

Each type of message can be graphically adorned with a graphical indication such as an icon, or a sign, or a color (e.g., red for alert, yellow for warning, green for notification).

The dashboard 200 can include a summary of largest payments and receipts (top payments 204). The summary of largest payments and receipts, can be formatted into a table or array showing largest payments and receipts that are scheduled to occur in the forecast period. The rows of such a table might show a payee, an amount, a date, a status, and a source.

In some cases, selecting an individual row shows additional details such as bank account, payment method, additional transaction information, payment ID, transaction source details, etc.

Referring to the pane comprising the forecasted net cash position 206, this display includes the forecasted net cash position as forecasted through the time period indicated. This area can display the net cash position for the enterprise. In some situations, such as when the forecasted cash position is outside of some predetermined range, then the system 100 can notify the cash manager and/or subordinates. Such a notification can come in the form of an SMS text, or email or other notification, and the notification might recommend actions to take based on the degree and/or severity of the variance from expectation.

The dashboard 200 can include a portfolio view (e.g., showing investment and debt mix 205). Such a portfolio view can indicate absolute and/or relative magnitudes of positions in the investment accounts 104. For example, a portfolio view pane 205 can display a magnitude of investment in securities and a magnitude of debt.

As earlier indicated, the herein-disclosed techniques that amalgamate information retrieved from many external sources (e.g., banks, currency exchanges, etc.) and from many internal sources (e.g., accounts payable, accounts receivable, etc.) to calculate a forecasted cash position, facilitates a cash manager's ability to make investment decisions earlier in a given business day, which in turn accelerates making trading decisions so as to be ready for trading at the first opportunity when the market opens.

Such an acceleration of making trading decisions increases in importance when considering the impact of major market moves in the face of global incidents such as the threat of Greece exiting the Eurozone, or of global incidents such as terrorist attacks. Being able to respond to these incidents quickly as the news and impact of the event(s) transpire enables the cash manager to (for example) limit corporate losses that could result from market moves in global economies.

Figure 3:
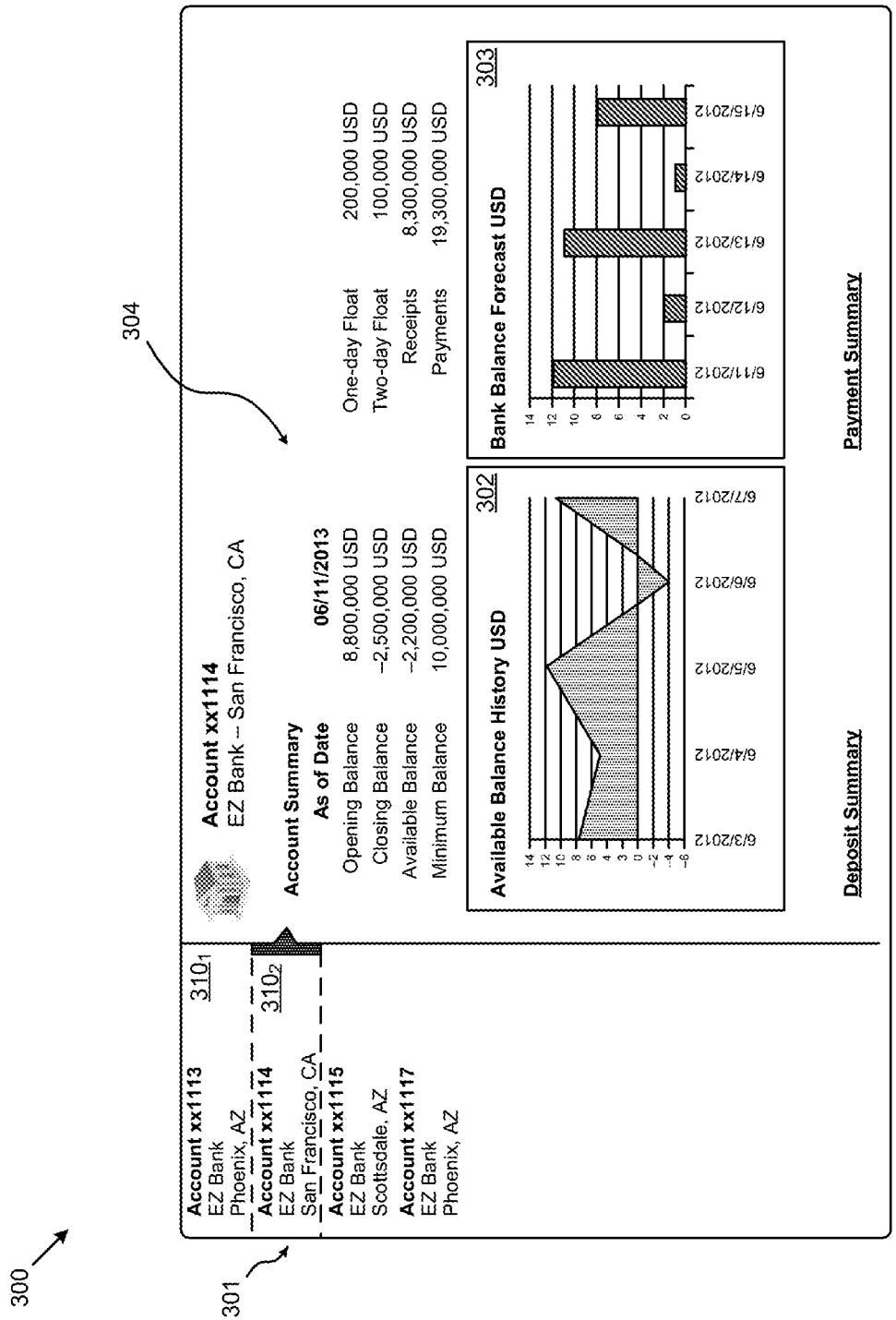
FIG. 3 is a screen device for a mobile terminal account summary display used as a graphical user interface to a system for cash position forecasting using real-time analytics, according to some embodiments.

FIG. 3 is a screen device for a mobile terminal account summary display 300 used as a graphical user interface to a system for cash position forecasting using real-time analytics. As an option, one or more instances of mobile terminal account summary display 300 or any aspect thereof may be implemented in the context of the architecture and functionality of the embodiments described herein. Also, the mobile terminal account summary display 300 or any aspect thereof may be implemented in any desired environment.

As earlier indicated, certain embodiments of the dashboard is configured to display an abstract view (e.g., an icon) or as a summary view (as shown) or as a detailed view. The screen device of FIG. 3 includes such a summary display. As shown the summary view include a bank listing pane, which listing comprises a listing of the individual banks and/or other financial institutions (e.g., bank listing $310_1$, bank listing $310_2$, etc.) that are under management by the cash manager. In some cases, the listing of the individual banks may correspond to a bank source group 112, or may be sorted or grouped in any other arrangement.

A display (e.g., mobile terminal account summary display 300) can include presentation of a summary organization 304 to include bank name, location and other identification; date of the summary; status; and summary information (e.g., opening balance, closing balance, available balance, etc.).

Such a display can further include charts (e.g., history of available bank balances 302, bank balance forecast 303, etc.). In some cases, such charts include a chart showing a time-series of historical bank balances over a period in juxtaposition to a chart showing a time-series of forecasted bank balances, where a particular item in the time-series of forecasted bank balances is a bank balance forecast after considering enterprise transactions that the bank might not yet have visibility into (e.g., transactions taken from the transaction pipeline 147).

In some cases, charts can be displayed on a desktop display screen or on a mobile terminal display screen, and the rendering of the charts and controls (e.g., scroll bars, menu items, page controls, etc.) may differ between the desktop display screen and the mobile terminal display screen. For ease of implementation and ease of use, certain code forming the rendering instructions (e.g., HTML, css, javascript, etc.) may be provided in one form for use with a desktop display screen, and in another form for use with a mobile terminal display screen. In some cases, there is a one-to-one correspondence between components of the rendering instructions (e.g., a portion of HTML, a portion of css, a javascript script or portion of a javascript script, etc.), and a mapping may be provided for ease of code use when rendering on a desktop display screen, versus rendering on a mobile terminal display screen.

In any cases of a display type and rendering, screen controls are provided for selecting (e.g., by double-clicking, or by press-hold touch, or by swipe, etc.) on an individual bank identifier 301 so as to cause still further details to be displayed. Such a detail display is shown and discussed in FIG. 4.

Figure 4:
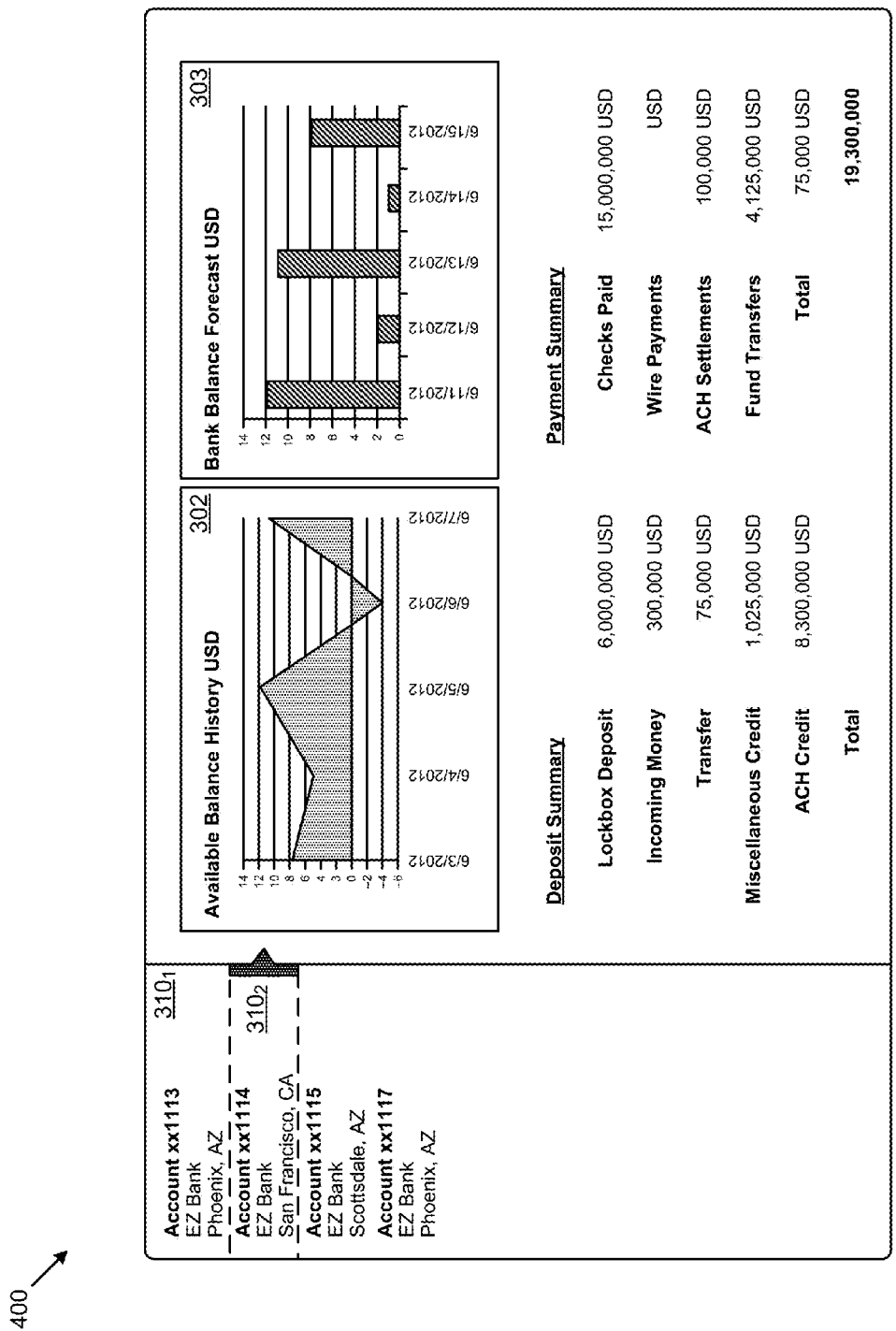
FIG. 4 is a screen device for a mobile terminal account detail display used as a graphical user interface to a system for cash position forecasting using real-time analytics, according to some embodiments.

FIG. 4 is a screen device for a mobile terminal account detail display 400 used as a graphical user interface to a system for cash position forecasting using real-time analytics. As an option, one or more instances of mobile terminal account detail display 400 or any aspect thereof may be implemented in the context of the architecture and functionality of the embodiments described herein. Also, the mobile terminal account detail display 400 or any aspect thereof may be implemented in any desired environment.

The detail display can include charts (e.g., reproduction of history of available bank balances 302, reproduction of bank balance forecast 303, etc.) as well as a breakdown to a lower level where constituent transactions and/or balances are listed by source (e.g., "lockbox deposits", "checks paid", etc.).

The aforementioned breakdowns of details are merely illustrative, and other breakdowns and views are reasonable and envisioned. Strictly as examples:

Currency Exposure: This view displays the position in each currency. This information is retrieved from internal sources (e.g., from the bank balances tables). A chart with breakdown across the relevant currencies displays the currency exposure. One embodiment limits the number of currencies shown in the chart by some number based on magnitude of exposure and then amalgamates the remaining currencies into an "Others" category.

Counterparty Exposure: This view displays the position in each counterparty. This information will be from internal sources. A chart with all counterparties displays the counterparty exposure.

Extended Forecast: This graph displays forecasted cash positions for the next M days. The forecasted cash position will be determined by using projected bank balances together with the transaction pipeline (e.g., as can be retrieved from internal sources). Balances and incoming/outgoing information can be obtained from a cash position worksheet. Drilldown for each day shows the details for each day, balance, and all the incoming and outgoing transactions. In an exemplary embodiment, swiping this graph displays a new graph to show a multi-day day trend.

Portfolio View: This pane displays the different portfolios (e.g., investment accounts 104 or positions within investment accounts 104) for the enterprise. Selecting a portfolio (e.g., clicking on a link or icon, or performing another selection operation) will take the user to a summary of deals in that portfolio. Each deal is displayed with the following attributes: (a) instrument type, (b) description, (c) maturity date, (d) amount, (e) counterparty, and (f) fair value.

A value of the portfolio at month end.

Overdue Payments/Receipts: Choosing this view shows a table with overdue payments and receipts as of today. The payments can be categorized with respect to a date range. Views can be configured to show payments sorted by age (e.g., overdue from 0 to 7 days, 2 weeks old, 1 month old and over a month, etc.).

Overdrawn Accounts: Choosing this view shows a table with all bank accounts that have a negative balance for today.

Some views can be presented in a tabular form. For example, each row in a table can characterize the following:

Maturing Deals: Choosing this view shows a table with deals sorted by their maturity date, for example starting with today and going out until the end of the current month. Each row in the table might provide further details pertaining to the following attributes: (a) deal id, (b) date, (c) amount and currency, (d) instrument type, (e) counterparty, (f) settlement date, and (g) source portfolio.

Debt Facilities: Choosing this view shows the balance for each debt facility, including line of credit facilities and commercial paper.

Market Rates: Choosing this view shows the various market rates for the day. Strictly as examples, market rates can include an FX spot rate, a 1-day float, a 2-day float, LIBOR, etc. The user can configure occurrence and formatting of any of the rates that should be shown in this table.

Additional Embodiments of the Disclosure

Additional Practical Applications

Figure 5:
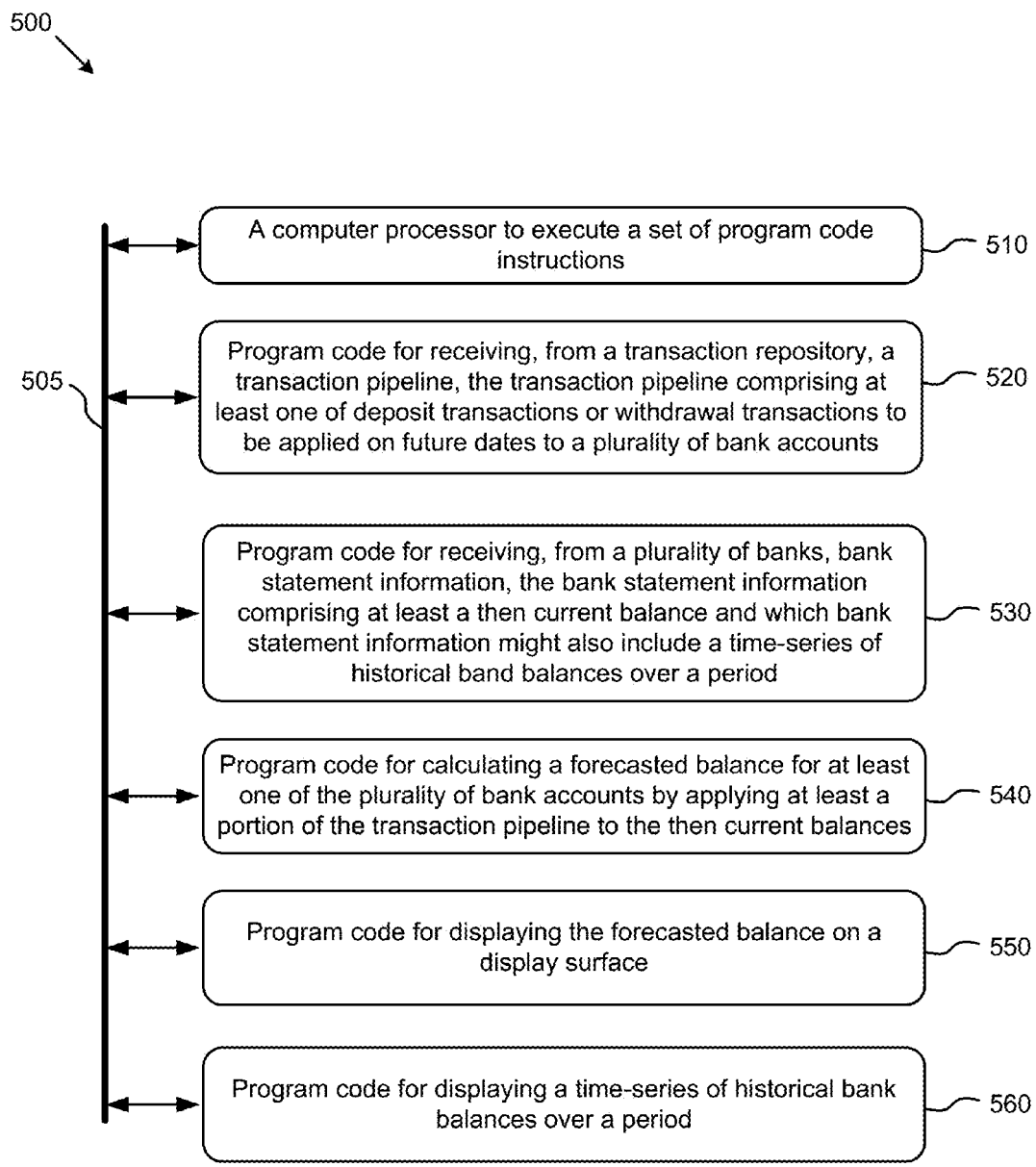
FIG. 5 is a block diagram of a system for cash position forecasting using real-time analytics, according to some embodiments.

FIG. 5 is a block diagram of a system for cash position forecasting using real-time analytics, according to some embodiments. As an option, the present system 500 may be implemented in the context of the architecture and functionality of the embodiments described herein. Of course, however, the system 500 or any operation therein may be carried out in any desired environment.

As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims.

The embodiment of FIG. 5 implements a portion of a computer system, shown as system 500, comprising a computer processor to execute a set of program code instructions (see module 510) and modules for accessing memory to hold program code instructions to perform: receiving, from a transaction repository, a transaction pipeline, the transaction pipeline comprising at least one of deposit transactions or withdrawal transactions to be applied on future dates to a plurality of bank accounts (see module 520); receiving, from a plurality of banks, bank statement information, the bank statement information comprising at least corresponding then current balances and which bank statement information might also include a time-series of historical bank balances over a period (see module 530); calculating a forecasted balance for at least one of the plurality of bank accounts by applying at least a portion of the transaction pipeline to the then current balances (see module 540); displaying the forecasted balance on a display surface (see module 550), and displaying (e.g., adjacent to the displayed forecasted balance) a time-series of historical bank balances over a period (see module 560).

Figure 6:
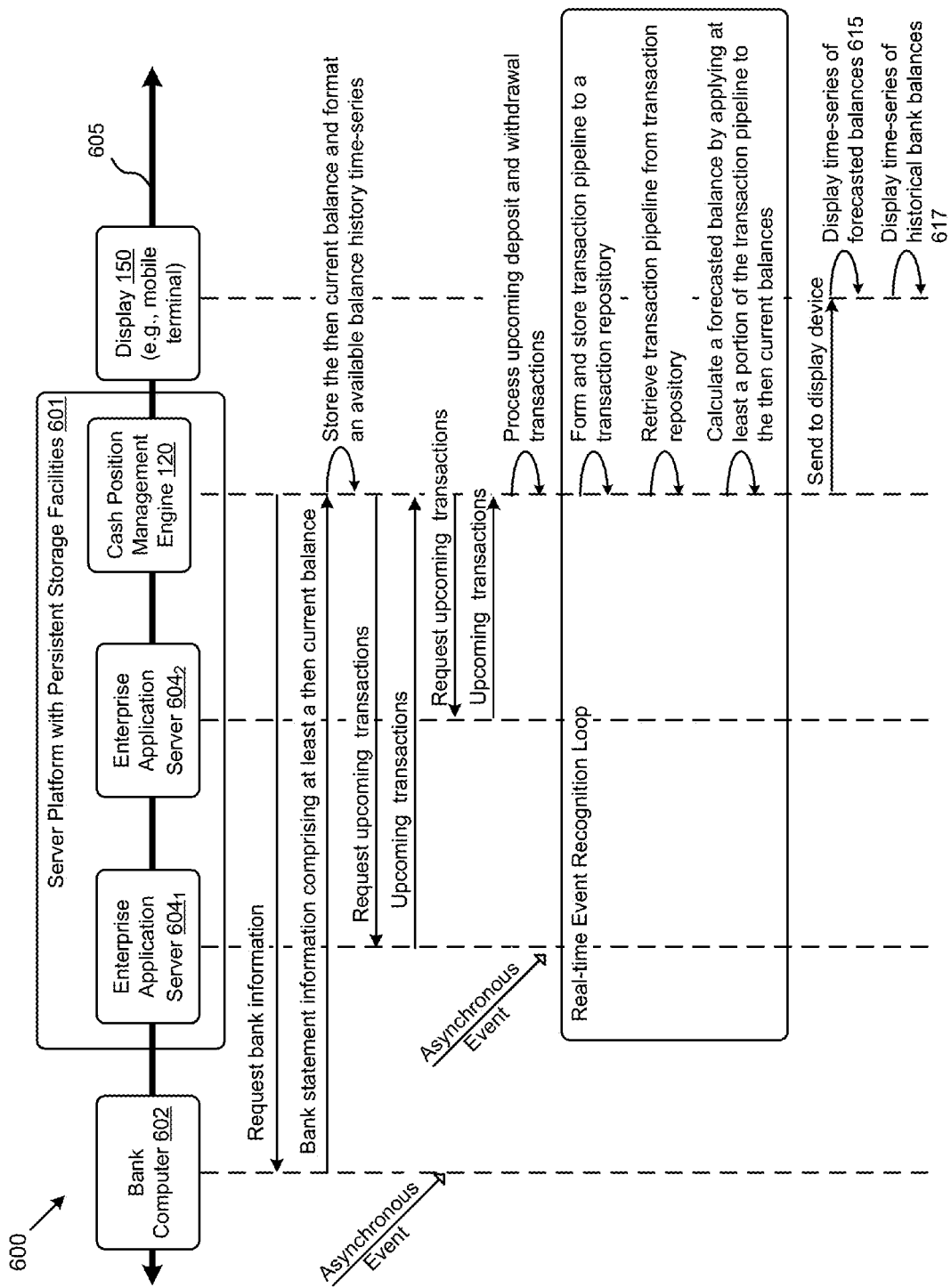
FIG. 6 is a block diagram of a system for cash position forecasting using real-time analytics, according to some embodiments.

FIG. 6 is a block diagram of a system for cash position forecasting using real-time analytics, according to some embodiments. As shown, system 600 comprises modules in the forms of a bank computer 602, application servers (e.g., enterprise application server 604$_1$, enterprise application server 604$_2$), a cash position management engine 120, and a display 150. The modules are connected to a communication link 605, and any module can communicate with other modules over communication link 605. The modules of the system can, individually or in combination, perform method steps within system 600. Any method steps performed within system 600 may be performed in any order unless as may be specified in the claims.

As shown, FIG. 6 implements a network of computer systems comprising: a server platform to receive bank statement information, the bank statement information comprising at least a then current balance; a storage repository (e.g., within persistent storage facilities 601) for storing a transaction pipeline (e.g., a transaction pipeline comprising at least one of deposit transactions or withdrawal transactions to be applied at future times to the then current balance); and a cash position management engine to calculate a forecasted balance by applying at least a portion of the transaction pipeline to the then current balance. A loop (e.g., the shown real-time event recognition loop) serves to receive asynchronous events (e.g., changes in a bank balance), retrieve the transaction pipeline, and apply the asynchronously-retrieved transaction pipeline to the then current balance. The real-time event recognition loop can listen continuously for asynchronous events, and have pre-prepared charts comprising a time-series of forecasted balances and a time-series of historical bank balances ready for rendering on a display 150. In exemplary embodiments the display surface bounds the rendering of chart showing the forecasted balance over a first period (see operation 615) in juxtaposition with a chart showing a time-series of historical bank balances over a second period (see operation 617).

System Architecture Overview

Additional Practical Applications

Figure 7:
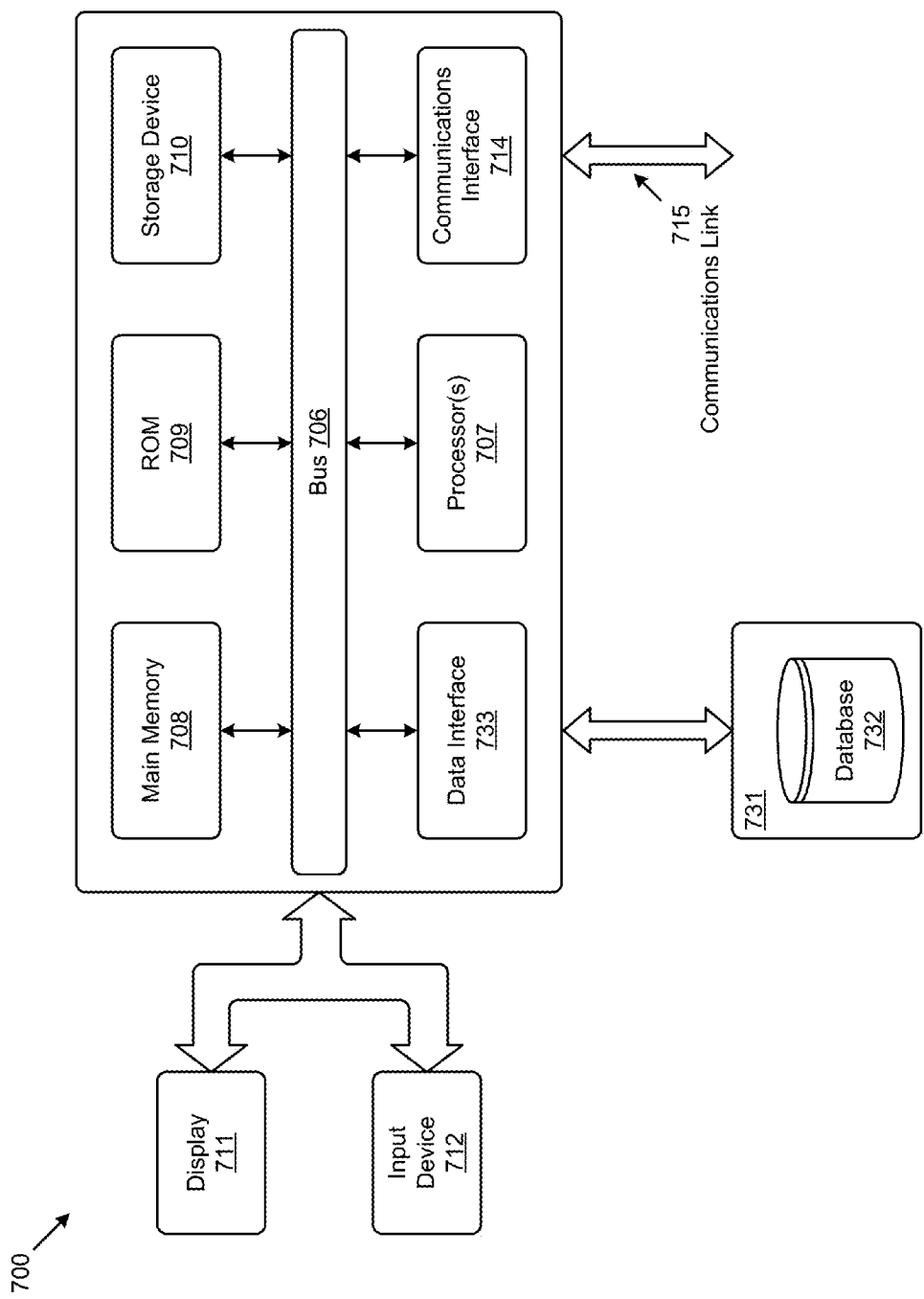
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method comprising:
   combining, at a management engine that interfaces with at least one internal source of data and at least one external source of data over one or more communication facilities, internal data received from the at least one internal source of data with external data received from the at least one external source of data, the at least one internal source of data referring to a data source that is internal to a server that is processing the data, and the at least one external source of data referring to a data source that is external to the server that is processing the data, and wherein the management engine is associated with a server platform comprising at least one persistent storage facility, and performs a process through a processor, the process comprising:
   receiving the external data from the at least one external source of data associated with an external server, the at least one external source of data comprising one or more financial institutions, wherein the external data from the at least one external source of data comprises bank statement information comprising one or more then current balances from each of the one or more financial institutions;
   receiving the internal data from the at least one internal source of data, wherein the internal data from the at least one internal source of data is organized into a transaction pipeline, the transaction pipeline comprising one or more upcoming transactions, the one or more upcoming transactions corresponding to at least one of scheduled deposit transactions or withdrawal transactions to be applied at a future time to the one or more then current balances;
   generating a forecasted data value by applying at least a portion of the internal data received from the at least one internal source of data to the external data received from the at least one external source of data, wherein one or more updates are generated to the forecasted data value by implementing a real-time event recognition loop at the server platform corresponding to the management engine, wherein a processing mechanism associated with the real-time event recognition loop:
   continuously monitors the at least one external source of data for an asynchronous event that occurs on the at least one external server associated with the at least one external source of data,
   upon detection of the asynchronous event, records an external data value of the external data at a time determined for the asynchronous event, and stores the external data value in the at least one persistent storage facility,
   asynchronously retrieves, in response to the detected asynchronous event, an internal data value of the internal data at the determined time for the asynchronous event from the transaction pipeline,
   applies the external data value to the internal data value to generate a respective update to the forecasted data value; and
   displaying, on a display device, display data comprising at least one of a most-current forecasted data value and a time-series set of data corresponding to a plurality of updates to the forecasted data value for a predetermined time period,
   wherein the real-time event recognition loop is implemented to monitor, in real-time, communications that are transmitted asynchronously between the at least one external server and a computer network associated with the server platform such that the respective update to the forecasted data value is rendered on the display device when a respective asynchronous event is detected based at least in part on the communications that are transmitted between the at least one external server and the computer network associated with the server platform, the server platform applying a second update value generated at a second asynchronous event to a first update value generated at a first asynchronous event to calculate at least a portion of the time-series set of data corresponding to the plurality of updates to the forecasted data value.

2. The method of claim 1, wherein the transaction pipeline further comprises a plurality of transactions from a first application and a second application.

3. The method of claim 2, wherein the first application is an accounts payable application.

4. The method of claim 2, wherein the second application is an accounts receivable application.

5. The method of claim 1 wherein the transaction pipeline comprises at least one transaction from a subsidiary.

6. The method of claim 1, further comprising forming a time-series chart of the plurality of updates to the forecasted data value.

7. The method of claim 1, further comprising providing a mapping between rendering on a desktop display and rendering on a mobile terminal display surface.

8. The method of claim 1, further comprising receiving a new transaction to be applied to a current balance.

9. The method of claim 1, wherein calculating a plurality of forecasted balances comprises applying a currency conversion to at least one transaction.

10. A computer program product embodied in a non-transitory computer readable medium, the computer readable medium having stored thereon a sequence of instructions which, when executed by a processor causes the processor to execute a process, the process comprising:

combining, at a management engine that interfaces with at least one internal source of data and at least one external source of data over one or more communication facilities, internal data received from the at least one internal source of data with external data received from the at least one external source of data, the at least one internal source of data referring to a data source that is internal to a server that is processing the data, and the at least one external source of data referring to a data source that is external to the server that is processing the data, and wherein the management engine is associated with a server platform comprising at least one persistent storage facility, and performs the following steps:

receiving the external data from the at least one external source of data associated with an external server, the at least one external source of data comprising one or more financial institutions, wherein the external data from the at least one external source of data comprises bank statement information comprising one or more then current balances from each of the one or more financial institutions;

receiving the internal data from the at least one internal source of data, wherein the internal data from the at least one internal source of data is organized into a transaction pipeline, the transaction pipeline comprising one or more upcoming transactions, the one or more upcoming transactions corresponding to at least one of scheduled deposit transactions or withdrawal transactions to be applied at a future time to the one or more then current balances;

generating a forecasted data value by applying at least a portion of the internal data received from the at least one internal source of data to the external data received from the at least one external source of data, wherein one or more updates are generated to the forecasted data value by implementing a real-time event recognition loop at the server platform corresponding to the management engine, wherein a processing mechanism associated with the real-time event recognition loop:

continuously monitors the at least one external source of data for an asynchronous event that occurs on the at least one external server associated with the at least one external source of data, upon detection of the asynchronous event, records an external data value of the external data at a time determined for the asynchronous event, and stores the external data value in the at least one persistent storage facility, asynchronously retrieves, in response to the detected asynchronous event, an internal data value of the internal data at the determined time for the asynchronous event from the transaction pipeline, applies the external data value to the internal data value to generate a respective update to the forecasted data value; and displaying, on a display device, display data comprising at least one of a most-current forecasted data value and a time-series set of data corresponding to a plurality of updates to the forecasted data value for a predetermined time period, wherein the real-time event recognition loop is implemented to monitor, in real-time, communications that are transmitted asynchronously between the at least one external server and a computer network associated with the server platform such that the respective update to the forecasted data value is rendered on the display device when a respective asynchronous event is detected based at least in part on the communications that are transmitted between the at least one external server and the computer network associated with the server platform, the server platform applying a second update value generated at a second asynchronous event to a first update value generated at a first asynchronous event to calculate at least a portion of the time-series set of data corresponding to the plurality of updates to the forecasted data value.

11. The computer program product of claim 10, wherein the transaction pipeline further comprises a plurality of transactions from a first application and a second application.

12. The computer program product of claim 11, wherein the first application is an accounts payable application.

13. The computer program product of claim 11, wherein the second application is an accounts receivable application.

14. The computer program product of claim 10 wherein the transaction pipeline comprises at least one transaction from a subsidiary.

15. The computer program product of claim 10, further comprising instructions for forming a time-series chart of the plurality of updates to the forecasted data value.

16. The computer program product of claim 10, further comprising providing a mapping between rendering on a desktop display and rendering on a mobile terminal display surface.

17. The computer program product of claim 10, further comprising instructions for receiving a new transaction to be applied to a current balance.

18. The computer program product of claim 10, wherein calculating the plurality of updates to the forecasted data value comprises applying a currency conversion to at least one transaction.

19. A computer system, comprising:

a management engine that interfaces with at least one internal source of data and at least one external source of data over one or more communication facilities, the management engine combining internal data received from the at least one internal source of data with external data received from the at least one external source of data, the at least one internal source of data referring to a data source that is internal to a server that is processing the data, and the at least one external source of data referring to a data source that is external to the server that is processing the data, wherein the management engine receives the external data from the at least one external source of data, the at least one external source of data comprising one or more financial institutions, wherein the external data from the at least one external source of data comprises bank statement information comprising one or more then current balances from each of the one or more financial institutions, the management engine being associated with a server platform comprising at least one persistent storage facility;

a storage repository to store internal data from at least one internal source of data wherein the internal data from the at least one internal source of data is organized into a transaction pipeline, the transaction pipeline comprising one or more upcoming transactions, the one or more upcoming transactions corresponding to at least one of scheduled deposit transactions or withdrawal transactions to be applied at a future time to the one or more then current balances;

a calculator engine to generate a forecasted data value by applying at least a portion of the internal data received from the at least one internal source of data to the external data received from the at least one external source of data, wherein one or more updates are generated to the forecasted data value by implementing a real-time event recognition loop at the server platform corresponding to the management engine, wherein a processing mechanism associated with the real-time event recognition loop:

continuously monitors the at least one external source of data for an asynchronous event that occurs on the at least one external server associated with the at least one external source of data, upon detection of the asynchronous event, records an external data value of the external data at a time determined for the asynchronous event, and stores the external data value in the at least one persistent storage facility, asynchronously retrieves, in response to the detected asynchronous event, an internal data value of the internal data at the determined time for the asynchronous event from the transaction pipeline, applies the external data value to the internal data value to generate a respective update to the forecasted data value; and a desktop display or a mobile terminal display surface, to display a display data comprising at least one of a most-current forecasted data value and a time-series set of data corresponding to a plurality of updates to the forecasted data value for a predetermined time period, wherein the real-time event recognition loop is implemented to monitor, in real-time, communications that are transmitted asynchronously between the at least one external server and a computer network associated with the server platform such that the respective update to the forecasted data value is rendered on a the display device when a respective asynchronous event is detected based at least in part on the communications that are transmitted between the at least one external server and the computer network associated with the server platform, the server platform applying a second update value generated at a second asynchronous event to a first update value generated at a first asynchronous event to calculate at least a portion of the time-series set of data corresponding to the plurality of updates to the forecasted data value.

20. The computer system of claim 19, wherein the transaction pipeline further comprises a plurality of transactions from a first application and a second application.

21. The method of claim 1, further comprising utilizing a real-time event recognition loop to retrieve the transaction pipeline.

* * * * *

UNITED STATES PATENT AND TRADEMARK OFFICE
CERTIFICATE OF CORRECTION

PATENT NO. : 9,665,857 B2  
APPLICATION NO. : 14/157512  
DATED : May 30, 2017  
INVENTOR(S) : Deepa Pai Saoji et al.

Page 1 of 1

It is certified that error appears in the above-identified patent and that said Letters Patent is hereby corrected as shown below:

In the Specification  
Column 1, Line 37:  
Please remove "that that" and Insert --that--

Column 5, Line 63:  
Please remove "any one or more banks" and Insert --any of one or more banks.--

Column 6, Line 7:  
Please remove "banks" and Insert --banks.--

Column 6, Line 13:  
Please remove "banks" and Insert --banks.--

In the Claims  
Claim 19, Column 16, Line 15:  
Please remove "a the" and Insert --a--

Signed and Sealed this  
Twenty-second Day of January, 2019

Andrei Iancu  
*Director of the United States Patent and Trademark Office*